3,678,013
PROCESS OF REACTING CARBOXY-TERMINATED POLYALKYLENE POLYMER WITH AN IMINE AND RESULTANT PRODUCT
Leon Sherwood Minckler, Jr., Watchung, N.J., assignor to Esso Research and Engineering Company
No Drawing. Filed Apr. 7, 1970, Ser. No. 26,421
Int. Cl. C08d 3/04, 5/02
U.S. Cl. 260—77.5 R      20 Claims

ABSTRACT OF THE DISCLOSURE

This invention is directed to polymers formed by the reaction of aziridines with carboxy-terminated polyalkylene polymers to produce reactive polymers having substantially the same molecular weight as the charge polymer.

BACKGROUND OF THE INVENTION

This invention relates to a novel rubbery polymer and to a process for preparing such a product. More particularly, it relates to a novel polymer characterized by its ability to be quickly converted to a rubbery cross-linked network.

As is well known to those skilled in the art, a wide variety of polymers have been prepared; and many of these polymers have been cured by reaction with other compositions to produce mastics which may find use as an adhesive, a sealant, a binder, etc.

It is an object of this invention to provide a novel process for preparing a composition which may be further treated or cured to form mastic compositions.

Other objects will be apparent to those skilled in the art from inspection of the following description.

SUMMARY OF THE INVENTION

In accordance with certain of its aspects, the novel method of this invention for preparing a polymer may comprise reacting in a reaction medium (a) a carboxy-terminated polyalkylene polymer having a number average molecular weight of 500 to 30,000 and about 2 terminal carboxyl groups per molecule with (b) at least one mole, per carboxyl group of said elastomer, of an imine

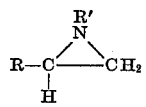

wherein R is a hydrocarbon moiety selected from the group consisting of hydrogen, alkyl, aryl, alkaryl, aralkyl, alkenyl and alkynyl, and R' is selected from the group consisting of hydrogen, R, and electron-withdrawing groups thereby forming reaction product of said carboxy-terminated polyalkylene polymer; maintaining said reaction medium at at least autogenous pressure; and recovering said product from said reaction medium.

DESCRIPTION OF THE INVENTION

The carboxy-terminated polyalkylene polymers having a number average molecular weight ($\overline{M}_n$) of 500 to 30,000 and about 2 terminal carboxyl groups per molecule may typically be those formed by ozonolysis of the reaction product of the copolymerization of a $C_4$ to $C_7$ isoolefin and a conjugated diolefin. Such elastomers are well known to those skilled in the art and are readily available. Typically, they may have been prepared by reacting 60–99.5 parts of a $C_4$ to $C_7$ isoolefin (such as 3-methyl-1-butene, 4-methyl-1-pentene, or preferably isobutylene) with 0.5 to 40 parts of a conjugated diolefin having the formula $R_1$—CH=CH—CH=CH—$R_2$. $R_1$ and $R_2$ may be hydrogen or hydrocarbon moieties, preferably hydrogen, phenyl, or lower alkyl (i.e. $C_1$ to $C_8$ alkyl); typical diolefins may include 1,3-butadiene; 2,4-hexadiene; etc. and preferably piperylene, i.e. pentadiene-1,3. All these diolefins have hydrogen atoms on the carbon atoms bearing the double bonds.

The polymer may be produced, in one mode of preparation, by reacting 0.5–40 parts, typically 2–10, say 5 parts of conjugated diolefin such as piperylene with 60–99.5 parts, typically 90–98, say 95 parts of $C_4$ to $C_7$ isoolefin such as isobutylene in a solvent such as methyl chloride using a Friedel-Crafts catalyst such as aluminum chloride. The typical polymer so prepared may have a viscosity average molecular weight $\overline{M}_v$ of 100,000 to 1,000,000 say 342,000 and an unsaturation of 0.3 mole percent to 30 mole percent, typically 1.5 to 7 mole percent, say 2.7 mole percent.

This polymer may be dissolved in desired inert, solvent, typically inert hydrocarbon solvent such as hexane, and ozonized (in the presence of e.g. pyridine) at for example $-80°$ C. to $85°$ C., typically $2°$ C. to $5°$ C., say $4°$ C. until reaction is complete, typically 0.1 to 8 hours, say 5 hours. The so ozonized polymer may then be typically heated at $50°$ C.–$150°$ C., say $68°$ C. for 0.1–4 hours, say 2 hours.

The reaction mixture may be cooled and washed with water optionally containing aqueous acid such as sulfuric acid. Separation of the hydrocarbon layer and removal of the hydrocarbon yields a carboxy-terminated polyalkylene polymer typically having the following properties:

TABLE I

| Property | Value Range | Typical |
|---|---|---|
| Number average molecular weight, $\overline{M}_n$ | 500–30,000 | 2,000 |
| Viscosity average molecular weight, $\overline{M}_v$ | 1,000–60,000 | 4,000 |
| Terminal carboxyl groups per polymer molecule | 1.6–2.3 | 2 |

It is a particular feature of these polyalkylene polymers, because of the manner in which they are prepared, that they may be essentially saturated homopolymers (e.g. of isobutylene) which have terminal residues derived from ozonolytic fission of the olefinic residues present in the parent copolymer, the composition being substantially as follows in a typical product:

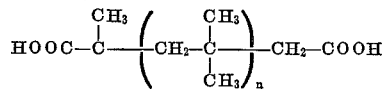

wherein $n$ may be 10–600. In the preferred embodiment, the homopolymer product will possess only two terminal carboxyl groups, one at each end of the polymer chain; and they will be substantially free of functionality, including carboxyl, along the backbone chain. Although the product may typically thus possess 2 terminal carboxyl groups per molecule, they may occasionally possess 1.6–2.3 terminal carboxyl groups per molecule because of interfering reactions during preparation or the presence of occasional olefinic side groups in the parent copolymer. Preferably, they may possess about 2 such groups per molecule.

Typical of the specific illustrative carboxy-terminated polyalkylene polymers may be the following:

(a) The product prepared from 95% isobutylene and 5% piperylene, ozonized by the above procedure yielding a polymer, having a number average molecular weight of about 1,940 and 0.00914 moles of carboxyl groups per gram, and 1.77 carboxyl groups per polymer molecule;

(b) The product prepared from 97% isobutylene and 3% piperylene, ozonized by the above procedure yielding a polymer having a number average molecular weight of 4200, and 1.8 carboxyl groups per polymer molecule;

(c) The product prepared from 90% isobutylene and 10% piperylene, ozonized by the above procedure yielding a polymer having a number average molecular weight of 1050, and 1.97 carboxyl groups per polymer molecule;

(d) The product prepared from 62.5% isobutylene and 37.5% 1,3-butadiene, ozonized by the above procedure yielding a polymer having a number average molecular weight of 7390, and 1.62 carboxyl groups per polymer molecule; and (e) The product prepared from 95% isobutylene and 5% piperylene, ozonized by the above procedure yielding a polymer having a number average molecular weight of 1800, and 1.93 carboxyl groups per polymer molecule.

In accordance with practice of the process of this invention, the carboxy-terminated polyalkylene polymer may be reacted with an imine or an aziridine.

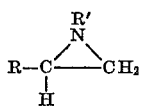

wherein R may be a hydrocarbon moiety, typically hydrogen, alkyl, aryl, alkaryl, aralkyl, alkenyl, or alkynyl. When R is alkyl, it may be methyl, ethyl, propyl, i-propyl, n-butyl i-butyl, t-butyl, hexyl, cyclohexyl, octyl, etc. When R is aryl, it may be phenyl, naphthyl, etc. When R is alkaryl, it may be tolyl, xylenyl, etc. When R is aralkyl, it may be benzyl, β-phenyl ethyl, etc. When R is alkenyl, it may be vinyl, allyl, buten-3-yl, etc. When R is alkynyl, it may be ethynyl, propynyl, butynyl, etc. The R group may be inertly substituted, i.e. it may bear a substituent which does not react with the other components of the process or interfere with the reaction. Typical inert substituents may include halogen, nitro, ether, aryl, alkyl, etc. Typical inertly substituted R radicals may include methylphenyl, nitrophenyl, 2-ethyl-hexyl, ethoxyethyl, methyl-cyclohexyl, 4-methyl-3-butenyl, etc. All the R groups in a particular compound need not be the same; preferably, however, they may be the same. More preferably, R may be alkyl and, more preferably, lower alkyl having 1 to 10 carbon atoms.

In the aziridine, R' may be selected from the group consisting of hydrogen, R, and electron-withdrawing groups. Typical electron-withdrawing groups may include acyl, i.e. R"CO— (wherein R" may be selected from the same group as that from which R is selected) such as acetyl, propionyl, benzoyl, alkyl, aryl, etc.; sulfonyl; phosphorus-containing groups such as dialkyl phosphonates, phosphoroso, and phospho; etc. In the preferred embodiment, R' may be hydrogen.

Typical imines may include:

Ethylene imine
Propylene-1,2-imine
Butylene-1,2-imine
Phenyl ethylene imine

The preferred imine may be ethylene imine wherein R and R' are hydrogen.

The process of this invention may be carried out by reacting one mole of carboxy-terminated polyalkylene polymer with at least one mole (per carboxyl group) of imine. Preferably, the molar amount of imine reacted will be essentially equal to the molar amount of carboxyl groups—commonly plus an excess of 5% to 300% over the stoichiometric.

The reaction medium in which the reaction may be carried out may include only the reactants themselves. The reaction medium may include an inert solvent such as an alcohol (e.g. isopropanol) or an inert hydrocarbon (e.g. hexane, benzene, toluene) or mixtures thereof or other inert solvent such as tetrahydrofuran, etc. When used, the inert solvent may be present in amount of 0 to 500 parts, say 200 parts per 100 parts of charge carboxy-terminated polyalkylene polymer. A preferred solvent is tetrahydrofuran.

Reaction may be effected commonly by admitting to the reaction mixture in the reaction zone a 10% to 100%, say 30% solution of charge polymer in inert solvent, typically tetrahydrofuran (THF). There may be added to the reaction mixture 1 to 5 moles, say 3 moles (per carboxyl group in the charge polymer) of imine, say ethylene imine. The reaction mixture may be agitated at preferred temperature of 25° C. to 200° C., say 100° C. for 1 to 24 hours, say 7 hours during which time autogenous pressure of 0 to 500 p.s.i.g., say 50 p.s.i.g. may develop. Higher pressure than autogenous may be used if desired.

At the conclusion of the reaction, the reaction mixture may be washed and/or filtered with the aid of a filter aid such as charcoal or diatomaceous earth to remove by-products and then stripped to recover inert solvent and unreacted imine and to remove volatile impurities and by-products such as water, alcohol, etc. The product so recovered may commonly be light amber to almost water white in color, odorless, and of viscosity and molecular weight essentially similar to that of the charge polymer.

Chemical analysis may reveal that at least one, and in the preferred embodiment, both of the terminal carboxyl groups of the carboxy-terminated polyalkylene polymer have reacted with the imine as follows:

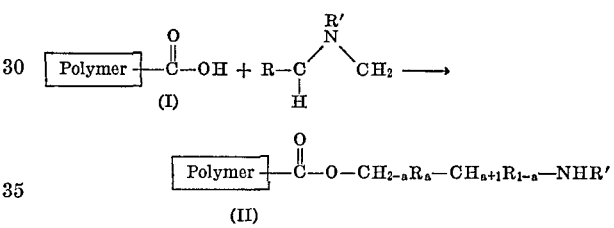

wherein $a$ may be 0 or 1.

More specifically, for the typical preferred charge polymer having two carboxyl groups, the reaction may be as follows:

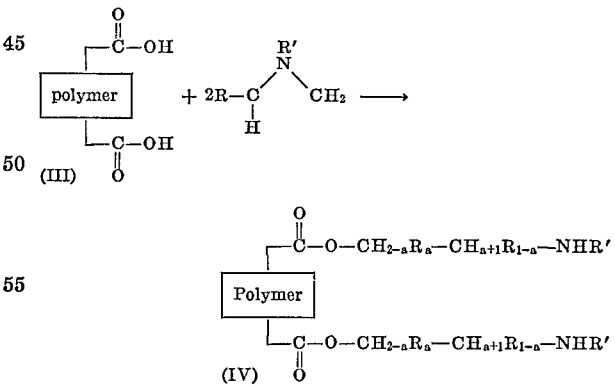

It is a feature of this invention that it may be possible to isolate the product IV when the reaction and the subsequent work-up are carried out in the presence of a strong acid, such as sulphuric acid, p-toluene sulfonic acid, perchloric acid, etc., at below about 25° C. and typically room temperature of 20° C. to 25° C. The so-obtained acid salts may later be converted to free amines, e.g. during curing, by the use of curing systems with suitable basic components which effect neutralization in situ.

However, in the preferred embodiment, the temperature may be permitted to rise during the reaction above about 25° C., and typically to 25° C. to 150° C., say 100° C., at which point the bis(beta-amino hydrocarbon ester) may spontaneously convert to (V), the bis(beta hydroxy hydrocarbon amide) of the carboxy-terminated polyalkylene polymer.

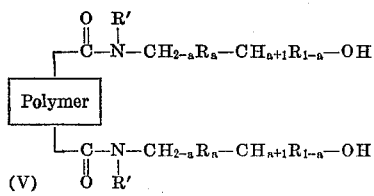

(V)

It will be apparent to those skilled in the art that the R groups in a particular molecule may be on the alpha or beta carbon of the amine or of the alcohol; and the specific isomer or ratio of isomers formed may be dependent upon the directing influence of the R group. Commonly mixtures may be obtained.

The novel products may be beta-hydroxy hydrocarbon amides of carboxy-terminated polyalkylene polymers, typically beta-hydroxy hydrocarbon amides of carboxy-terminated polyisobutylene polymers and preferably beta-hydroxy ethyl amides of carboxy-terminated polyisobutylene polymers. In the preferred embodiment, the product may be a bis(beta-hydroxy hydrocarbon amide) of a carboxy-terminated polyalkylene polymer, typically a bis-(beta-hydroxy ethyl amide) of a carboxy-terminated polyisobutylene polymer. These novel products which may be substantially free of (i.e. containing commonly less than 15%) functionality at non-terminal portions of the polymer chain may be represented by the following specific formula:

(VI)
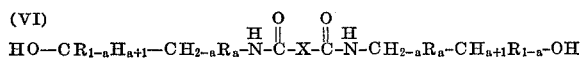

wherein $a$ is 1 or 0; X is a polyalkylene nucleus of a carboxy-terminated polyalkylene homopolymer which is substantially free of functionality at non-terminal portions of the polymer chain; and R is a hydrocarbon moiety selected from the group consisting of hydrogen, alkyl, aryl, alkaryl, aralkyl, alkenyl, and alkynyl. In the preferred embodiment, they may be polymers of the formula:

(VII)
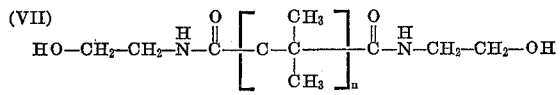

wherein $n$ is 10 to 600, say 40.

The novel bis(beta-hydroxy hydrocarbon amides) of the carboxy-terminated polymers may be typically characterized by the following properties:

(a) Ease of curing at room temperature;
(b) Number average molecular weight of 500 to 30,000, typically 2000—usually essentially the same as that of the charge polymer; and
(c) The presence of beta-hydroxy hydrocarbon amide groups in place of (in the preferred embodiment) both the terminal carboxy groups of the polymer.

It is a particular feature of the novel products that they may be characterized by their fast cure properties, e.g. at room temperature. Curing may be effected in the presence of catalysts for curing, typically including 2,4,6-tris(dimethylaminoethyl) phenol, typically as sold under the trademark DMP (30).

The preferred curing agents may be polymethylene polyphenyl isocyanate, typically as sold under the trademark PAPI (50), in 50% solution in hydrocarbon; toluene diisocyanate; and hexamethylene diisocyanate.

Curing may be effected by mixing curing amounts, typically 1%–20%, preferably 5 % to 15%, say 10 wt. percent of curing agent with the uncured product. Curing at room temperature at 20° C. to 25° C. of the mixture may readily be effected in 0.05 to 4 hours in contrast to e.g. the charge carboxyterminated polyalkylene polymer which would be cured in a much longer time, e.g. greater than 24 hours and which would evolve gaseous carbon dioxide.

Curing at ambient to elevated temperatures of 15° C. to 200° C., say 20° C. can be effected in 1 to 120 minutes, say 5 minutes in contrast to the charge polymer which would take more than a day to cure.

Curing of these novel products under these conditions in short time unexpectedly permits attainment of cross-linked elastomeric networks possessing satisfactory properties, including insolubility in solvents for the uncured polymer.

It is a particular feature of the novel products of this invention that they may be cured with epoxides, acids, isocyanates, anhydrides, etc., to yield useful mastic, coating, plastic, or elastomeric products.

DESCRIPTION OF A PREFERRED EMBODIMENT

The novel process of this invention may be carried out in accordance with the following examples wherein all parts are parts by weight.

Example I

In this example which represents practice of a preferred embodiment of the process of this invention, the charge carboxy-terminated polyalkylene elastomer homopolymer may be prepared by continuously polymerizing 95 parts of isobutylene and 5 parts of piperylene in 300 parts of methyl chloride solvent at −94° C. with agitation (with 40 minutes residence time) in the presence of 0.08 part of aluminum chloride catalyst. Product may be water washed, separated, dried, and extruded to yield 80 parts of a polyisobutylene-piperylene polymer having a viscosity average molecular weight $\overline{M}_v$ of 250,000, and an unsaturation of 3.1 mole percent.

20 parts of this polymer may be dissolved in 100 parts of hexane solvent and 4 parts of reagent grade pyridine added. A stream containing 0.018 part of ozone per 1000 parts of oxygen may then be bubbled beneath the surface of the polymer solution at 2° C. to 5° C. for 5 hours. The product may be found to be the ozonide of the charge polymer wherein substantially all the unsaturation (derived from the piperylene monomer) is ozonized.

The solution of ozonized polymer, maintained under a nitrogen blanket, may be heated to 68° C. for 2 hours to complete the cleavage reaction. The solution may be acid washed and heated to strip out hexane at 150° C.

The carboxy-terminated polyisobutylene polymer may have a number average molecular weight of 1800, a viscosity average molecular weight of 3600, and may contain 1.93 carboxyl groups per polymer molecule.

In practice of the novel process of this invention, the so-obtained carboxy-terminated polyisobutylene (commonly referred to as CTPIB) in amount of 40 parts may be mixed with 5.06 parts (equivalent to 3 moles per carboxyl group) of ethylene imine in 20 parts of hexane and 80 parts of tetrahydrofuran. The reaciton mixture may be maintained at steam-bath temperature of about 100° C. and autogenous pressure in a closed vessel for 7 hours, during which time it is separated into two layers. After cooling to ambient temperature, it was filtered through a bed of diatomaceous earth and charcoal. The mixture was then stripped of hexane and tetrahydrofuran. The product may be found to be a viscous liquid, light yellow and clear, having an acid number of 0.53 (indicating essentially complete reaction, the charge polymer having an acid number of 60), a number average molecular weight of 1948, and be characterized by the conversion of all of the carboxyl groups to (beta-hydroxy ethyl) amide groups.

The product was cured by mixing the following components:

TABLE II

| Components: | Parts |
|---|---|
| Polymer | 100 |
| PAPI (50) | 16.2 |
| DMP (30) | 1 |

On testing, it was found that (after curing for 15 minutes at 90° C.), the product had a swelling ratio (in cyclohexane) of 2.73 and a cyclohexane-insoluble content of 80%.

When cured for 240 minutes at 23° C., the swelling ratio was 2.60 and the cyclohexane-insolubles were 77%. These values indicate a good tight cure and are typical of products having good physical properties.

Example II

The (beta-hydroxy ethyl) amide of the carboxy-terminated polyisobutylene polymer of Example I may be readily reacted with diisocyanates, such as toluene diisocyanate to yield urethanes. Formation of a typical polyurethane may be effected by mixing 100 parts of the (beta-hydroxy ethyl) amide with 10.4 parts of commercially available toluene diisocyanate. After mixing, the mixture may be permitted to stand for 15 minutes at 90° C. during which time thickening may be observed as the polyurethane product is cured. The product so obtained may be a useful, sealant-mastic which may be used for a wide variety of mastic applications. It has a swelling ratio in cyclohexane of 5.47 and it has cyclohexane insoluble of 93%. When cured at room temperature of 23° C. for 4 hours, the swelling ratio was 2.78 and the cyclohexane insolubles were 98%. It is unexpected that such a low swelling ratio (i.e. such a good "tight cure") could be obtained at room temperature in such a short time.

Results comparable to those obtained in Examples I and II may be obtained by use of the following polymers:

Example III

The procedure of Example II was followed except that 9 parts of hexamethylene diisocyanate was used in place of the toluene diisocyanate. Curing at 90° C. for 15 minutes yielded a product having a swelling ratio of 3.01 and an insoluble of 94% (both in cyclohexane). Curing at 23° C. for 24 hours yielded a product having a swelling ratio of 3.48 and 78% insolubles. Results comparable to those of Examples I and II may be obtained by use of the polymers noted in Examples IV–VII.

Example IV

The polymer prepared by the reaction of 95 mole percent of isobutylene and 5 mole percent of piperylene having a number average molecular weight of 1940, about 0.00914 mole of carboxyl groups per gram, and 1.77 carboxyl groups per polymer molecule.

Example V

The polymer prepared by the reaction of 97 mole percent of isobutylene and 3 mole percent of piperylene having a number average molecular weight of 4200, a viscosity average molecular weight of 8000, and 1.8 carboxyl groups per polymer molecule.

Example VI

The polymer prepared by the reaction of 90 mole percent of isobutylene and 10 mole percent of piperylene having a number average molecular weight of 1050, a viscosity average molecular weight of 1950, and 1.97 carboxyl groups per polymer molecule.

Example VII

The polymer prepared by the reaction of 62.5 mole percent of isobutylene and 37.5 mole percent of 1,3-butadiene having a number average molecular weight of 7390, a viscosity average molecular weight of 13,500, and 1.62 carboxyl groups per polymer molecule.

Results comparable to those obtained in Examples I and II may be obtained by use of the following imines:

Example VIII 1.2-imino-propane.

Example IX 2,3-imino-butane.

Example X

Phenyl ethyl imine.

Although this invention has been illustrated by reference to specific embodiments, it will be apparent to those skilled in the art that various changes and modifications may be made which clearly fall within the scope of this invention.

What is claimed is:

1. The method of preparing a polymer which comprises reacting in a reaction medium (a) a carboxy-terminated polyalkylene polymer having a number average molecular weight of 500 to 30,000 and about 2 terminal carboxyl groups per molecule with (b) at least one mole, per carboxyl group of said polymer, of an imine.

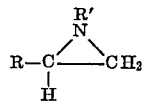

wherein R is a hydrocarbon moiety selected from the group consisting of hydrogen, alkyl, aryl, alkaryl, aralkyl, alkenyl, and alkynyl, and R' is selected from the group consisting of hydrogen, R, and electron-withdrawing groups, thereby forming reaction product of said carboxy-terminated polyalkylene polymer; maintaining said reaction medium at at least autogenous pressure; and recovering said reaction product from said reaction medium.

2. The method of preparing a polymer as claimed in claim 1 wherein the reaction temperature is between about 25 and about 150° C.

3. The method of preparing a polymer as claimed in claim 1 wherein the reaction temperature is between about 20 and about 25° C.

4. The method of preparing a polymer as claimed in claim 1 wherein said polymer has two terminal carboxyl groups per molecule.

5. The method of preparing a polymer as claimed in claim 1 wherein said imine is a lower alkylene imine.

6. The method of preparing a polymer as claimed in claim 1 wherein said imine is ethylene imine.

7. The method of preparing a polymer as claimed in claim 1 wherein said reaction is carried out in inert solvent reaction medium.

8. The method of preparing a polymer as claimed in claim 1 wherein said carboxy-terminated polyalkylene polymer is a carboxy-terminated polyisobutylene polymer.

9. The method of preparing a polymer which comprises reacting in a reaction medium (a) a carboxy-terminated polyalkylene polymer having a number average molecular weight of 500 to 30,000 and about 2 terminal carboxyl groups per molecule with (b) at least one mole, per carboxyl group of said polymer, of an imine

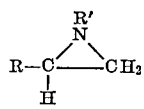

wherein R is a hydrocarbon moiety selected from the group consisting of hydrogen, alkyl, aryl, alkaryl, aralkyl, alkenyl, and alkynyl, and R' is selected from the group consisting of hydrogen, R, and electron-withdrawing groups, thereby forming reaction product bis(beta hydroxy hydrocarbon amide) of said carboxy-terminated polyalkylene polymer; maintaining said reaction medium at at least autogenous pressure and temperature between about 25 and 150° C.; and recovering said amide reaction product from said reaction medium.

10. The method of preparing a polymer which comprises reacting in a reaction medium (a) a carboxy-terminated polyalkylene polymer having a number average molecular weight of 500 to 30,000 and about 2 terminal carboxyl groups per molecule with (b) at least one mole, per carboxyl group of said polymer, of an imine

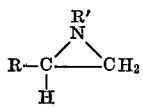

wherein R is a hydrocarbon moiety selected from the group consisting of hydrogen, alkyl, aryl, alkaryl, aralkyl, alkenyl, and alkynyl, and R' is selected from the group consisting of hydrogen, R, and electron-withdrawing groups, thereby forming reaction product beta-amino hydrocarbon ester of said carboxy-terminated polyalkylene polymer; maintaining said reaction medium at at least autogenous pressure and temperature between about 20 and about 25° C.; and recovering said ester reaction product from said reaction medium.

11. A novel polymer which comprises a bis(beta-amino hydrocarbon ester) of a carboxy-terminated polyalkylene polymer.

12. A novel polymer as claimed in claim 11 which comprises beta-amino hydrocarbon ester of a carboxy-terminated polyalkylene polymer which is substantially free of functionality at non-terminal portions of the polymer chain.

13. A novel polymer which comprises bis(beta-hydroxy hydrocarbon amide) of a carboxy-terminated polyalkylene polymer.

14. A novel polymer which comprises bis(beta-hydroxy ethyl amide) of a carboxy-terminated polyalkylene ester.

15. A novel polymer of the formula

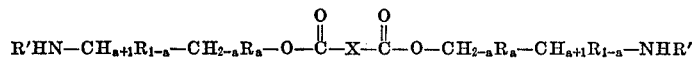

wherein X is a polyalkylene nucleus of a carboxy-terminated polyalkylene polymer which is substantially free of functionality at non-terminal portions of the polymer chain; R is a hydrocarbon moiety selected from the group consisting of hydrogen, alkyl, aryl, alkaryl, aralkyl, alkenyl, and alkynyl, and R' is selected from the group consisting of hydrogen, R, and electron-withdrawing groups, $a$ being 0 or 1.

16. A novel polymer of the formula

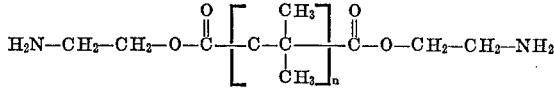

wherein $n$ is 10 to 600.

17. A novel polymer of the formula

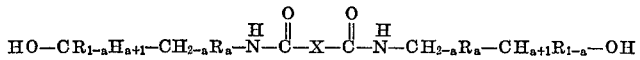

wherein X is a polyalkylene nucleus of a carboxy-terminated polyalkylene polymer which is substantially free of functionality at non-terminal portions of the polymer chain; R is a hydrocarbon moiety selected from the group consisting of hydrogen, alkyl, alkaryl, aralkyl, alkenyl, and alkynyl, and R' is selected from the group consisting of hydrogen, R, and electron-withdrawing groups, $a$ being 0 or 1.

18. A novel polymer of the formula

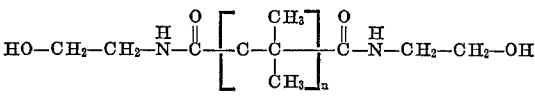

wherein $n$ is 10 to 600.

19. A cured polymer having as base a bis (beta-hydroxy hydrocarbon amide) of a carboxy-terminated polyalkylene polymer which comprises (a) bis(beta-hydroxy hydrocarbon amide) of a carboxy-terminated polyalkylene polymer and cured thereinto (b) a curing amount of an isocyanate curing agent.

20. A cured polymer as claimed in claim 19 wherein said polymer is the reaction product of two moles of a lower alkylene imine and one mole of a bis carboxy-terminated polyalkylene polymer.

References Cited

UNITED STATES PATENTS

| | | | |
|---|---|---|---|
| 3,097,193 | 7/1963 | Gruver | 260—85.1 |
| 3,234,197 | 2/1966 | Baum | 260—93.7 |
| 3,514,432 | 5/1970 | Burton | 260—85.3 |

JOSEPH L. SCHOFER, Primary Examiner

R. A. GAITHER, Assistant Examiner

U.S. Cl. X.R.

260—2 EN, 85.3